(No Model.)
D. MURRAY.
VEHICLE WHEEL.
No. 246,189. Patented Aug. 23, 1881.
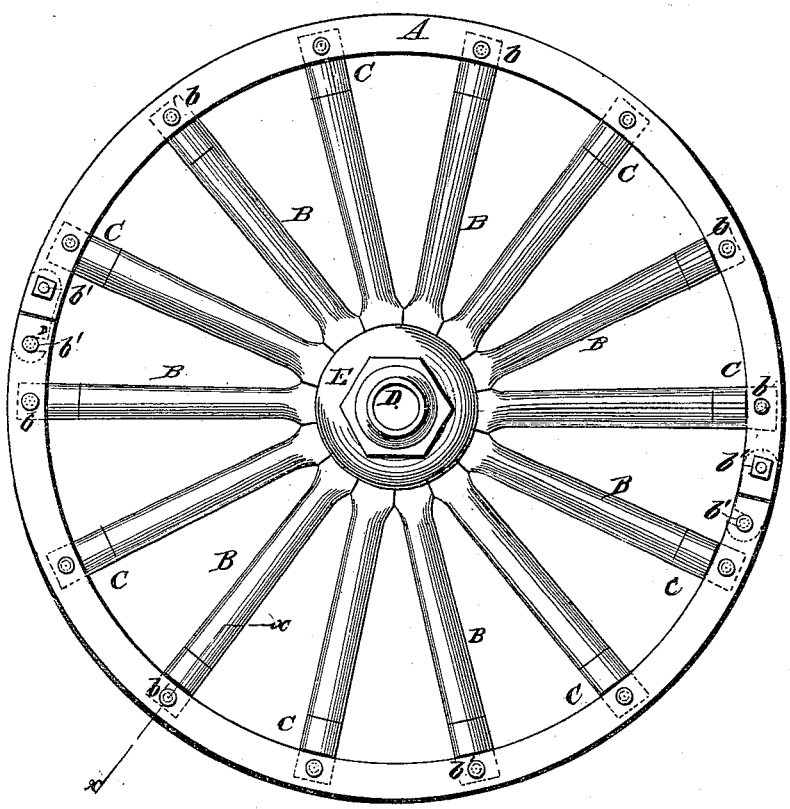
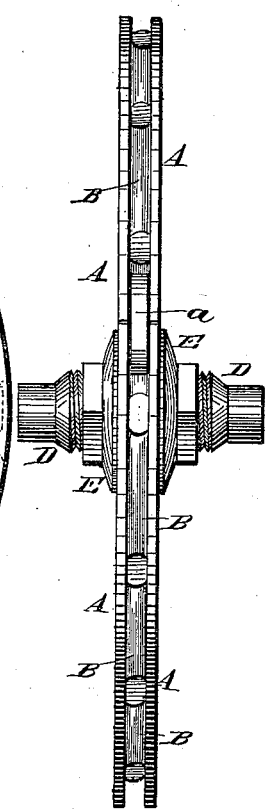
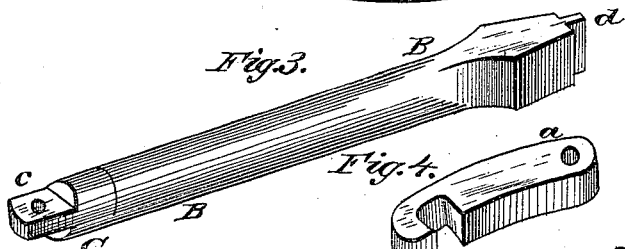
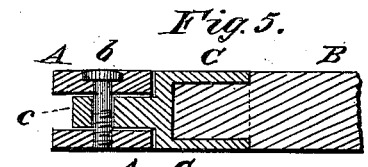
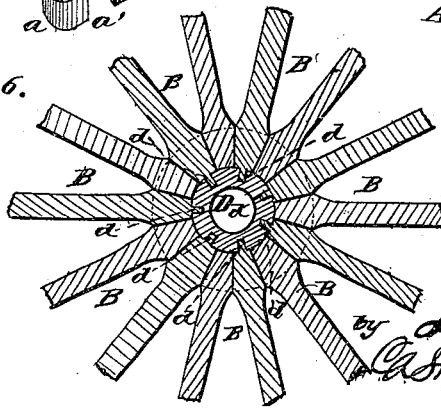
WITNESSES
INVENTOR

United States Patent Office.

DANIEL MURRAY, OF ASH GROVE, MISSOURI, ASSIGNOR OF ONE-THIRD TO E. A. HURT, OF SAME PLACE.

VEHICLE-WHEEL.

SPECIFICATION forming part of Letters Patent No. 246,189, dated August 23, 1881.

Application filed June 28, 1881. (No model.)

*To all whom it may concern:*

Be it known that I, DANIEL MURRAY, of Ash Grove, in the county of Greene and State of Missouri, have invented certain new and useful Improvements in Vehicle-Wheels; and I do hereby declare that the following is a full, clear, and exact description of the invention, which will enable others skilled in the art to which it appertains to make and use the same, reference being had to the accompanying drawings, which form a part of this specification.

This invention relates to an adjustable vehicle-wheel in which the outer ends of the spokes are secured between the rims or bands of a double felly by means of tenoned sockets, the ordinary tire being dispensed with; and the invention consists in the construction and arrangement of parts as hereinafter more fully described.

In the annexed drawings, which fully illustrate the invention, Figure 1 is a side view of my improved wheel. Fig. 2 is an edge view. Fig. 3 is a view of a spoke. Fig. 4 is a view of a clamping-bar. Fig. 5 is a section through the felly on the line $x\ x$; and Fig. 6 is a section through the hub.

The rim or felly, which also forms a tire, is composed of four semicircular bands, A A, arranged in pairs, two on each side of the wheel, with an intervening space in which are secured the outer ends of the spokes B. Each spoke is provided at its outer end with a socket or ferrule, C, having upon its end a tenon, $c$, that enters between the rims A A, the sockets at the sides of the tenons thus forming shoulders for the support of the rims, which are secured to the tenons $c$ by countersunk screw-bolts $b$. The opposite rims A A are arranged parallel with each other, and are secured by the clamping braces or bars $a\ a$, which are placed between the rims at their ends, and by the countersunk screw-bolts $b'\ b'$. The bars or braces $a\ a$ are provided with suitable openings for the passage of the screw-bolts, one of said openings, $a'$, being of larger size than is necessary for the passage of the bolt, so that the rim may be shortened or rendered adjustable, as hereinafter described.

The spokes B are provided alternately at their inner ends with tenons $d$, which enter suitable mortises in the hub D, the remaining spokes resting on the body of the hub, and the spokes being so constructed and arranged that they bind at their inner ends. The spokes are thus securely connected with the hub by means of the flanged screw-caps E on each side without the necessity of employing rivets, which are so apt to weaken them.

By this construction the wheels of a vehicle can be uniformly set to any grade of dish required, and by moving the screw passing through the openings $a'$ in the clamping-bars the ends of the rims A A may be filed or trimmed to adjust them to the increased dish of the wheel, the elongated opening $a'$ in the clamping-bar enabling the parts to be again filed without difficulty. The ferrules or tenoned sockets C protect the ends of the spokes and afford a strong attachment to the rims, which are thus braced so that the usual tendency to wear to an angle or corner at the ends of the spokes is obviated, the rim of the wheel remaining round until worn out. As the felly is composed of sectional rims having an intervening space it also presents a smaller frictional surface, which enables the wheel to run with greater lightness.

Having thus fully described my invention, what I claim as new, and desire to secure by Letters Patent of the United States, is—

1. As an improvement in vehicle-wheel fellies, the four semicircular flat rims clamped together to form two parallel complete circles, the ends of the rims abutting against but not overlapping each other, as set forth.

2. In a vehicle-wheel, the combination, with the hub D, of the spokes B, alternately provided with tenons $d$, and the screw-caps E E, all constructed and arranged as and for the purpose described.

In testimony that I claim the foregoing as my own I have hereto affixed my signature in presence of two witnesses.

DANIEL MURRAY.

Witnesses:
A. J. NORRIS,
B. F. HAWKINS.